Figure 1:
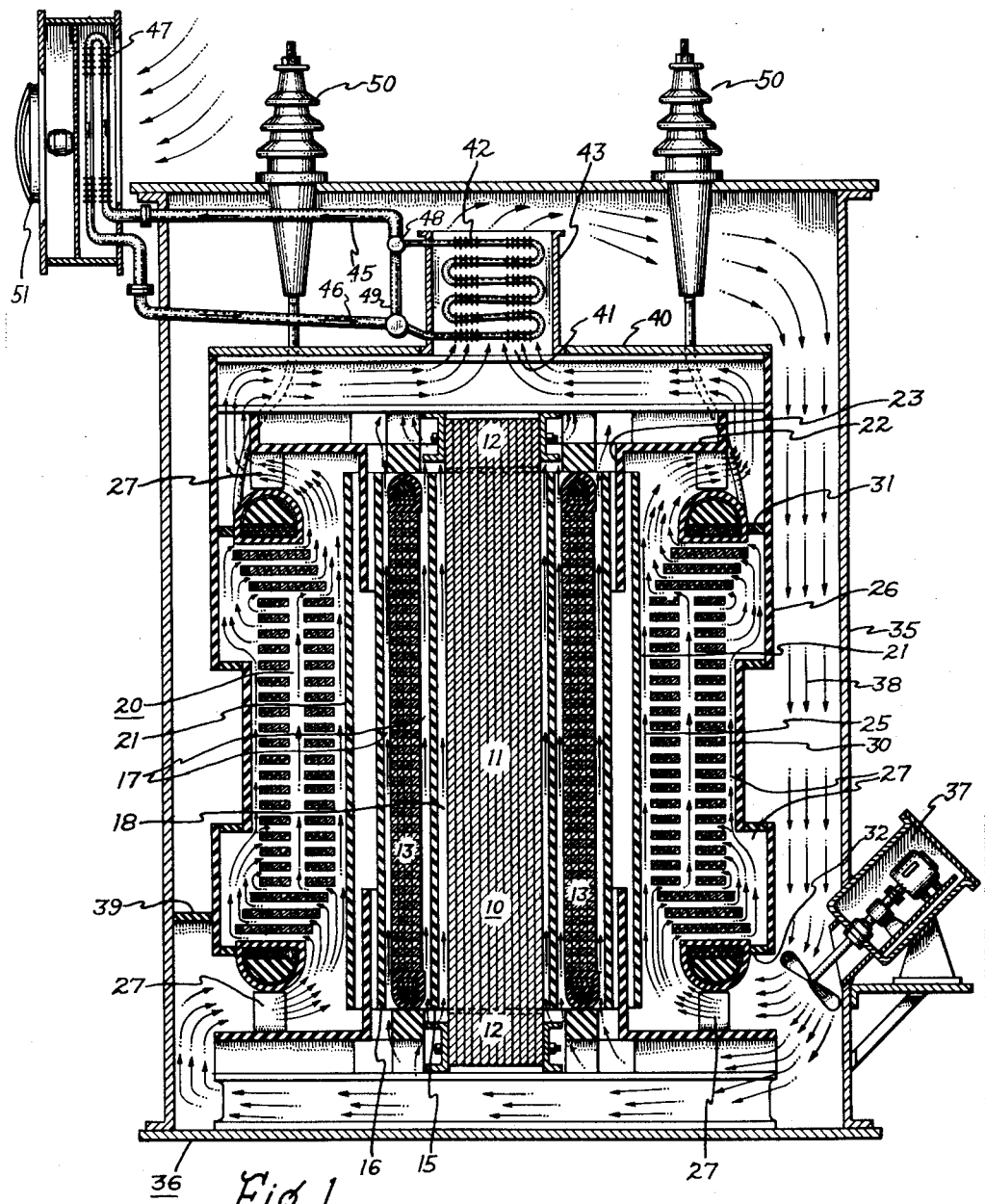

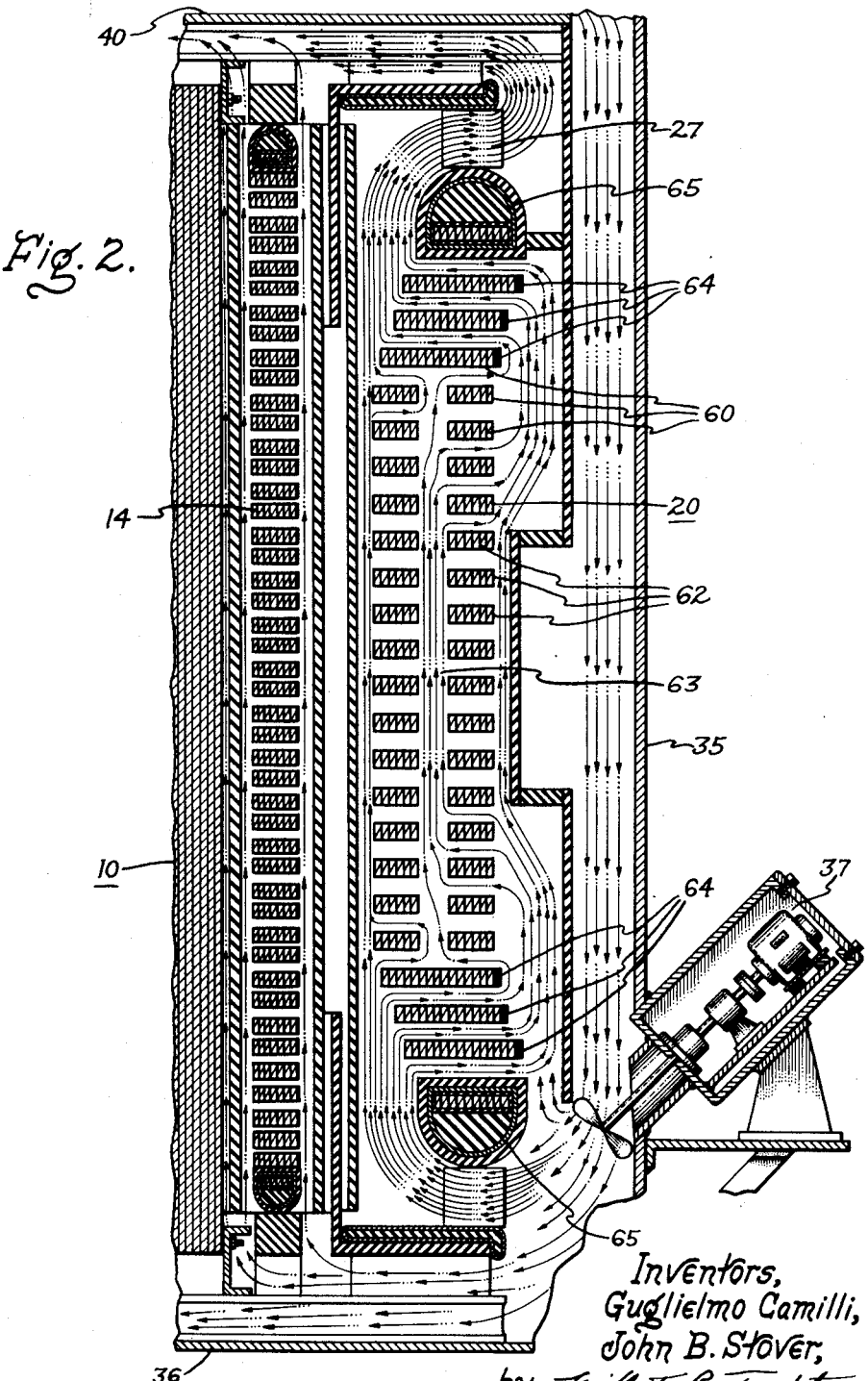

United States Patent Office 2,942,213
Patented June 21, 1960

---

2,942,213

WINDING ARRANGEMENT FOR ELECTRICAL APPARATUS

Guglielmo Camilli and John B. Stover, Pittsfield, Mass., assignors to General Electric Company, a corporation of New York Filed Mar. 27, 1959, Ser. No. 802,466

8 Claims. (Cl. 336—60)

This invention relates to stationary electrical induction apparatus, and more in particular to an improved winding structure for electrical apparatus of the type employed in systems for the generation and distribution of electrical power.

Transformers of one type are comprised of a magnetic core having one or more winding legs surrounded by windings and being disposed within a sealed enclosure. The enclosure is filled with a dielectric fluid, such as an electronegative gas, and the fluid is circulated through the windings in order to remove the heat therefrom. Various heat transfer means may then be employed to dissipate the heat of the fluid to the atmosphere. In order to more effectively remove heat from the windings, ducts may be provided through the windings, and these ducts in combination with suitable barriers serve to direct the fluid in closer heat transfer relationship with the windings.

The present invention is primarily concerned with an electrical winding of the type comprised of a plurality of axially spaced apart coaxial disk shaped coils. Such windings are frequently disposed between a pair of concentric insulating barriers, the barriers being radially spaced from the windings to form inner and outer circulating ducts. When such barriers are used as the sole means for directing the flow of dielectric, the removal of heat from the winding is not great since the gas passes in effective heat transfer relationship only with the radially inner and outer turns of each coil. In order to increase the contact between the fluid and the coils, previous windings have employed annular barriers disposed in the inner and outer ducts in order that the fluid must flow in a zig-zag path across the faces of the coils. While such an arrangement is satisfactory from the standpoint of heat transfer characteristics, considerable expense is involved in the fabrication of such a winding, and the capacity of circulating pumps for forcing the fluid through the winding must be increased in view of the increased resistance to the flow of fluid through the zig-zag path.

In another arrangement for cooling the winding, the winding is provided with inner and outer radial ducts, as in the previous example, and each of the coils is radially split to form a central annular duct extending from one end of the winding to the other. Once again, the heat transfer characteristics of the winding are improved by such an arrangement, but the use of such a central duct interferes with the electrical characteristics provided by "rib" shields or taped turns on the radially outer extremities of the axially endmost coils, as well as with the annular rounded shields that must be provided adjacent the ends of very high potential windings.

It is therefore an object of this invention to provide an improved winding arrangement for windings of the type comprised of a plurality of axially spaced-apart disk shaped coils.

Another object is to provide a winding or stationary electrical induction apparatus, the winding being of the type comprising a plurality of axially spaced apart disk shaped coils, and being characterized by the fact that improved cooling efficiency is provided without interfering with electrical shielding at the ends of the coil, and without employing expensive zig-zag barriers.

Still another object of this invention is to provide means for increasing the cooling efficiency of a fluid passing through a winding of the type comprised of a plurality of axially spaced-apart disk shaped coils, the efficiency being increased without the necessity for employing central ducts through the end coils or annular barriers in the radially inner and outer duct to zig-zag the flow of fluid across the surfaces of all coils.

Briefly stated, in accordance with the preferred aspects of this invention, we provide an electrical winding for stationary electrical induction apparatus. The winding is comprised of a plurality of axially spaced apart co-axial disk shaped coils. Electrostatic shields, otherwise commonly known as "rib" shields are provided on the radially outer edges of the axially endmost coils. Shields of this type are disclosed in U.S. Letters Patent No. 2,279,027, which issued on an application of J. M. Weed and J. R. Meador, and is assigned to the assignee of the present invention. The endmost coils are also radially continuous, while the center coils are radially split to provide an axially extending annular duct. Insulating cylinders are provided spaced radially inwardly and radially outwardly of the winding, thereby providing radially inner and outer circulating ducts, and means are provided for directing a flow of cooling dielectric fluid between the cylinders at the lower end of the windings. Barrier means are also provided to block the duct between one of the cylinders and the upper end of the winding.

While the specification concludes with claims particularly pointing out and distinctly claiming the subject matter which we regard as our invention, it is believed that the invention will be better understood from the following description taken in connection with the accompanying drawings.

In the drawings:

Fig. 1 is a cross-sectional view of a transformer, and illustrating a high voltage winding according to the present invention, and Fig. 2 is an enlarged view of a modified portion of the transformer of Fig. 1, illustrating more clearly the high voltage winding therein.

Referring now to the drawings, and more in particular to Fig. 1, therein is illustrated a transformer comprising a magnetic core 10. The core 10 may conventionally be of the plate type comprised of a plurality of stacks of flat strips of magnetic material arranged to form at least one winding leg 11 extending between a pair of parallel yoke members 12. In the present instance, the winding leg 11 extends vertically between the horizontal yoke members 12. The winding leg 11 is surrounded by a low voltage winding 13 which may be a layer winding as illustrated in the figure, or it may be a disk type winding 14 as illustrated in Fig. 2 comprised of a plurality of axially spaced apart disk shaped coils. The low voltage winding 13 is disposed between a pair of insulating cylinders 15 and 16 and radially spaced therefrom to provide axially extending annular ducts 17. The inner insulating cylinder 15 is also spaced radially from the winding leg 11 in order to provide a circulating duct 18 adjacent to the magnetic core. A high voltage winding 20 is provided radially outwardly of and concentric with the low voltage winding 13, and the high voltage and low voltage windings may be further separated by an additional cylindrical insulating barrier 21 extending concentrically with the insulating cylinder 16. An annular insulating collar 22 is provided extending from the insulating barrier 21 radially outwardly beyond a substantial portion of the high voltage winding 20, adjacent each end of the high voltage winding, and the collar 22 has an axially extending portion separating the ends of the insulating cylinders 16 and 21. While the illustration shows a gap between the extending portion 23 of collar 22 and the insulating cylinder 16 and 21, this space is exaggerated, and in an actual transformer would not be sufficiently large for an appreciable amount of fluid to flow therethrough. The insulating barriers for cylinders 16 and 21 and the collar 22 serve to provide the necessary dielectric strength and length of creepage paths between the high and low voltage windings. The high voltage winding 20 is axially separated from the insulating cylinder 21 to form an inner axially extending annular circulating duct 25. Another insulating cylinder 26 is provided radially upwardly of the high voltage winding 20, and is separated radially therefrom to provide an outer annular circulating duct 27. The high voltage and low voltage windings may be axially clamped by any suitable means with the axial clamping forces being transmitted, for example, to the magnetic core as is the conventional practice. Since this feature does not form a part of the present invention, it will suffice to say that the high voltage winding 20 is axially clamped by way of block means 27 spaced around the ends of the high voltage winding 20, the axially clamping forces being transmitted by any suitable means through the blocks 27 and collars 22.

The portion of the outer insulating cylinder 26 adjacent the central portion of the high voltage winding 20 has a reduced diameter so that the portion 30 of duct 27 in the region of the central portion of the high voltage windings has a reduced radial dimension. An annular barrier 31 is provided extending between the insulating cylinder 26 and the upper end of the high voltage winding, thereby blocking the duct 27 at its upper end, and if desired, a similar barrier 32 may also be provided extending between the insulating cylinder 26 and the lower end of the high voltage winding. As will be explained in more detail in the following paragraphs, however, the provision of the lower annular barrier 32 is not essential to the effective cooling of the high voltage winding.

The outer insulating cylinder 26 is radially spaced from the walls 35 of a tank 36 enclosing the core and windings and a circulating fan or pump 37 is provided in any suitable position, for example in the lower portion of the wall 35, to direct a dielectric fluid which fills the tank 36, downwardly through the space 38 between the cylinder 26 and the tank wall, and thence upwardly through the winding ducts. Any suitable additional barriers 39 may be provided between the walls of the tank 36 and the insulating cylinder 26 in order to substantially confine the upward flow of fluid through the winding ducts.

An annular collar 40 is provided in the upper portions of the tank 36, the collar 40 extending radially outwardly to the upper ends of the insulating cylinder 26. The collar 40 directs the flow of fluid through a central aperture 41 therein, to thereby pass the fluid across the heat transfer coils 42 of a heat transfer system to be disclosed in more detail in the following paragraphs. The flow of fluid through the heat transfer coils 42 may be confined by means of an insulating cylinder 43 surrounding the aperture 41 and having an open upper end to permit the fluid to pass therethrough and return to the circulating pump 37 by way of the spaces 38 between the insulating cylinder 26 and tank wall 25.

The heat transfer coils 42 are connected by way of upper and lower conduits 45 and 46 respectively to heat exchanger 47 disposed externally of the enclosure. A volatile liquid is provided within the coils 42, the liquid having a boiling point at about the operating temperature of the transformer. Vapors are formed in the coils 42 as a result of passage of heated gases externally across the coils, and the vapors rise through the conduit 45 to the heat exchanger 47 where they are condensed due to the dissipation of heat to the atmosphere. The condensed liquid returns to the coils 42 by way of conduit 46. A trap 48 in the conduit 45 may be provided to trap any entrained liquid and return it to the coils 42 by way of a conduit 49, in order to prevent the liquid from entering the external heat exchanger. An external fan 51 may be provided to force air across the external heat exchanger to increase the dissipation of heat from the system. While the illustrated transfer system is especially adaptable to apparatus employing electronegative gases such as sulfurhexafluoride as the dielectric fluid within the tank 36, it will be obvious that any conventional arrangement for dissipation of heat from the fluid within the tank 36 may be employed without departing from the spirit or scope of this invention.

As in conventional practice, high voltage electrical insulating bushings 50 are provided extending through the top of the tank 36 to provide an external connection to the windings of the transformer.

The high voltage winding 20 is comprised of a plurality of axially spaced apart coaxial disk shaped coils 60. The endmost coils 61 are radially continuous, while the central coils 62 are radially split to form a central axially extending annular duct 63. Electrostatic shields or rib shields 64 are provided on the radially outer extremities of the endmost coils 61, according to conventional practice for the electrostatic shielding of such windings, and similarly a rounded electrostatic shield 65 is provided adjacent each axial end of the winding and electrically connected to one of the endmost turns of the winding. The axial clamping force on the winding 20 is transmitted thereto, as was previously stated, by way of the blocks 27, which bear on the ends of the annular shield member 65. In order to further improve the electrical field surrounding the end of the primary winding 20 and thereby increase the dielectric strength of the winding, the endmost coils 61 may be stepped radially outwardly toward the axial ends of the winding.

The circulation path for the fluid through the high voltage winding 20 is illustrated by the arrows in Figures 1 and 2. Thus, the fluid is forced by means of the circulating fan 37 into the lower end of the duct 25 between the insulating cylinder 21 and the primary winding. Since the end coils of the primary winding are stepped radially outwardly toward the bottom, the width of the duct 25 decreases as the fluid moves upwardly and thereby a portion of the fluid is forced radially across the faces of the lower endmost coil 61. After passing across the faces of the lower endmost coils, a portion of this fluid is then forced between the ducts between some of the adjacent central split coils 62 and into the central duct 63 due to the reduction in width of the duct 27 adjacent the reduced diameter portion of the cylinder 26. A portion of the fluid from the duct 25 may also be forced into the central duct 63. The fluid then continues upwardly through the ducts 25, 63, and 27 until the reduced diameter portion of the insulating cylinder 26 is passed. Then, since the upper end of the central duct 63 is blocked by the upper endmost coils 61, the majority of the fluid is forced radially outwardly between adjacent split coils 62, into the upper portion of the duct 27. The barrier 31 between the upper end of the primary winding and the insulating cylinder 26 then directs the fluid across the faces of the radially continual upper endmost disk coils, whereupon it joins the fluid flowing upwardly to the duct 25. The fluid then passes between the support blocks 27 and the upper end of the winding, is directed by means of the collar 40 into heat transfer relationship with the heat transfer coil 42, and thence downwardly through the space 38 between the wall 35 of the tank and the insulating barrier or cylinder 26 to the circulating fan 37.

While the barrier 32 between the lower end of the primary winding 20 and the insulating cylinder 26 as shown in Fig. 1 may serve to slightly increase the removal of heat from the winding, the barrier may be omitted as shown in Fig. 2 since it is not essential for the reasons that the upper endmost coils will generally be substantially hotter than the lower endmost coils, and since the lower endmost coils are stepped a portion of the fluid will be forced across their bases even without the use of the lower barrier 32.

In the arrangement of the present invention, as previously disclosed, the efficiency of removal of heat from a primary high voltage winding is increased by employing a central duct in the central portion of the winding, and by providing means of forcing the fluid radially the bases of the edmost coils. The cooling efficiency is thus increased without interfering with the use of electrostatic shields or rib shields on the endmost windings, and without the necessity for providing a zig-zag path for the fluid throughout the high voltage winding. Since a zig-zag flow is not required, the resistance of the fluid path through the primary winding is not substantially increased, and therefore there is no material increase in the required capacity of the circulating fan.

It will be understood, of course, that, while the form of the invention herein shown and described constitutes the preferred embodiment of our invention, it is not intended herein to illustrate all of the possible equivalent forms or ramifications thereof. It will also be understood that the words employed are words of description rather than of limitation, and that various changes may be made without departing from the spirit or scope of the invention herein disclosed, and is aimed in the appended claims to cover all such changes as fall within the true spirit and scope of the invention.

What we claim as new and desire to secure by Letters Patent of the United States is:

1. Stationary electrical induction apparatus comprising a winding disposed within a sealed dielectric fluid filled enclosure, said winding comprising a plurality of axially spaced apart coaxial disk shaped coils, insulating cylinder means disposed radially inwardly and radially outwardly of said winding and spaced from said winding to form a pair of axially extending annular ducts, the axially endmost coils of said winding being radially continuous and having electrostatic shields on their radially outer edges, the center coils of said winding being radially split to form an axially extending annular central duct, means for directing a flow of said dielectric fluid into at least one of said pair of ducts at the lower end of said winding, and means for blocking the upper end of the other duct of said pair of ducts.

2. Stationary electric induction apparatus comprising a magnetic core disposed within a sealed dielectric fluid filled enclosure, said core having a winding leg, a low voltage winding surrounding said winding leg and insulated therefrom, a high voltage winding surrounding said low voltage winding and radially spaced therefrom, said high voltage winding comprising a plurality of axially spaced apart coaxial disk-shaped coils, insulating cylinder means disposed radially inwardly and radially outwardly of said winding and spaced from said high voltage winding to form a pair of axially extending annular ducts, the axially endmost coils of said high voltage winding being radially continuous and the center coils of said high voltage winding being radially split to form an axially extending annular central duct, means for directing the flow of dielectric fluid into at least one of said pair of ducts at the lower end of said high voltage winding, and means for blocking the upper end of the other duct of said pair of ducts.

3. Stationary electrical induction apparatus comprising a winding disposed within a sealed dielectric gas-filled enclosure, said winding comprising a plurality of axially spaced apart coaxial disk-shaped coils, insulating cylinder means disposed radially inwardly and radially outwardly of said winding and spaced from said winding to form a pair of axially extending annular ducts, the axially endmost coils of said winding being radially continuous and stepped radially outwardly toward the axial ends of said winding, electrostatic shields on the radially outer edges of said inmost coils, the center coils of said winding being radially split to form an axially extending annular central duct, means for directing a flow of dielectric gas into at least one duct of said pair of ducts at the lower end of said winding, and means for blocking the upper end of the other duct of said pair of ducts.

4. Stationary electrical induction apparatus comprising a winding disposed within a sealed dielectric fluid filled enclosure, said winding comprising a plurality of axially spaced apart coaxially disk-shaped coils, insulating cylinder means disposed radially inwardly and radially outwardly of said winding and spaced from said winding to form inner and outer axially extending annular ducts, the axially end-most coils of said winding being radially continuous and being stepped radially outwardly toward the axial ends of said winding, electrostatic shield means on the radially outer edges of said end-most coils, the center coils of said winding being radially split to form an axially extending annular central duct, said radially outer duct having a decreased width portion adjacent said center coils, means for directing flow of said dielectric fluid into said inner duct at the lower end of said winding, and means for blocking the upper end of said outer duct.

5. Stationary electrical induction apparatus comprising a magnetic core disposed within a sealed dielectric fluid filled enclosure, said core having a winding leg, a low voltage winding surrounding said winding leg and insulated therefrom, a high voltage winding surrounding said low voltage winding and radially spaced therefrom, said high voltage winding comprising a plurality of axially spaced apart coaxial disk-shaped coils, insulating cylinder means disposed radially inwardly and radially outwardly of said high voltage winding and radially spaced from said high voltage winding to form inner and outer axially extending annular ducts, the axial end-most coils of said high voltage winding being radially continuous and being stepped outwardly toward the axial ends of said high voltage winding, electrostatic shields on the radially outer edges of said end-most coils, the center coils of said high volting winding being radially split to form an axially extending annular central duct, said outer duct having a reduced width portion adjacent said center coils, means for directing a flow of said dielectric fluid into said inner duct at the lower end of said high voltage winding, and means for blocking the upper end of said outer duct.

6. Stationary electrical induction apparatus comprising a magnetic core disposed within a sealed dielectric fluid filled enclosure, said core having winding leg, and low voltage winding surrounding said winding leg and insulated therefrom, a high voltage winding surrounding said low voltage winding and radially spaced therefrom, said high voltage winding comprising a plurality of axially spaced apart coaxial disk-shaped coils, insulating cylinder means disposed radially inwardly and outwardly of said high voltage winding and spaced therefrom to form an inner and outer axially extending annular duct, the axially end-most coils of said high voltage winding being radially continuous and stepped radially outwardly toward the ends of said high voltage winding, electrostatic shields on the radially outer edges of said end-most coils, annular electrostatic shields means adjacent the axial ends of said high voltage winding, the center coils of said winding being radially split to form an axially extending annular central duct, the portion of said outer duct adjacent said center coils having reduced width, means for directing a flow of said dielectric fluid into said inner duct at the lower end of said winding, and means for blocking the upper and lower ends of said outer duct.

7. The electrical apparatus of claim 6, in which said dielectric fluid is an electronegative gas.

8. Stationary electrical induction apparatus comprising a winding disposed within a sealed dielectric fluid filled enclosure, said winding comprising a plurality of axially spaced apart coaxial disk-shaped coils, the axially endmost of said coils being radially continuous and the axially central coils being radially split to form a central axially extending annular duct, and means for directing a flow of said fluid within said enclosure radially across said endmost coils and axially through said duct.

References Cited in the file of this patent
UNITED STATES PATENTS
2,414,990     Weed _____ Jan. 28, 1947